United States Patent [19]

Rubingh et al.

[11] Patent Number: 4,661,288

[45] Date of Patent: * Apr. 28, 1987

[54] ZWITTERIONIC COMPOUNDS HAVING CLAY SOIL REMOVAL/ANTI/REDEPOSITION PROPERTIES USEFUL IN DETERGENT COMPOSITIONS

[75] Inventors: Donn N. Rubingh; Eugene P. Gosselink, both of Cincinnati, Ohio

[73] Assignee: The Procter & Gamble Company, Cincinnati, Ohio

[*] Notice: The portion of the term of this patent subsequent to Nov. 5, 2002 has been disclaimed.

[21] Appl. No.: 709,614

[22] Filed: Mar. 8, 1985

Related U.S. Application Data

[63] Continuation of Ser. No. 452,556, Dec. 23, 1982, abandoned.

[51] Int. Cl.$^4$ .......................... C11D 1/62; C11D 1/65; C11D 3/37; C07C 141/00; C07C 87/00

[52] U.S. Cl. .................... 252/545; 252/526; 252/528; 252/529; 252/547; 252/548; 260/501.12; 544/78; 544/85; 544/86; 546/186; 546/246; 546/248; 560/24; 560/32; 560/29; 560/45; 560/49; 560/50; 560/55; 560/64; 560/88; 560/171; 560/158; 560/160; 560/166; 564/52; 564/59; 564/60; 564/152; 564/153; 564/155; 564/159; 560/165; 564/201; 564/224; 564/294; 564/295; 564/443; 564/503; 525/417/ 525/523

[58] Field of Search ............... 252/523, 525, 526, 527, 252/528, 541, 545, 548, 547; 260/458 R, 501.12; 560/29, 24, 32, 45, 49, 50, 55, 64, 88, 171, 158, 160, 166; 544/78, 85, 86; 546/186, 246, 248; 564/52, 59, 60, 152, 153, 155, 503, 159, 165, 201, 224, 294, 295, 443

[56] References Cited

U.S. PATENT DOCUMENTS

| | | | |
|---|---|---|---|
| 2,272,489 | 2/1942 | Ulrich | 260/239 |
| 2,296,225 | 9/1942 | Ulrich | 260/239 |
| 2,701,239 | 2/1955 | Ryznar | 252/321 |
| 2,778,814 | 1/1957 | Behrens et al. | 260/98 |
| 2,792,369 | 5/1957 | Dickson | 252/344 |
| 2,792,370 | 5/1957 | Dickson | 252/344 |
| 2,792,371 | 5/1957 | Dickson | 252/344 |
| 2,792,372 | 5/1957 | Dickson | 252/344 |
| 2,979,528 | 4/1961 | Lundsted | 260/584 |
| 3,040,076 | 6/1962 | Seidel et al. | 260/404 |
| 3,113,113 | 12/1963 | Marsh et al. | 252/392 |
| 3,154,489 | 10/1964 | DuBrow et al. | 252/8.75 |
| 3,178,366 | 4/1965 | DuBrow et al. | 252/8.8 |
| 3,200,106 | 8/1965 | Dickson et al. | 260/97.5 |
| 3,200,155 | 8/1965 | Kirkpatrick et al. | 260/584 |
| 3,236,671 | 2/1966 | Dybalski et al. | 106/277 |
| 3,294,695 | 12/1966 | Tippett | 252/199 |
| 3,301,783 | 1/1967 | Dickson et al. | 252/47.5 |
| 3,336,231 | 8/1967 | Marsh et al. | 252/547 |
| 3,398,197 | 8/1968 | Miller et al. | 564/504 |
| 3,418,374 | 12/1968 | Miller et al. | 260/583 |
| 3,444,200 | 5/1969 | Miller et al. | 564/282 |
| 3,470,060 | 9/1969 | Szitz et al. | 428/373 |
| 3,473,919 | 10/1969 | Metcalfe et al. | 75/103 |
| 3,473,998 | 10/1969 | Spriestersbach et al. | 428/373 |
| 3,489,686 | 1/1970 | Parran | 252/106 |
| 3,492,352 | 1/1970 | Miller et al. | 260/570.8 |
| 3,497,482 | 2/1970 | Hwa | 260/29.6 TA |

(List continued on next page.)

FOREIGN PATENT DOCUMENTS

| | | |
|---|---|---|
| 2085 | 5/1979 | European Pat. Off. |
| 43622 | 1/1982 | European Pat. Off. |
| 1298077 | 6/1969 | Fed. Rep. of Germany |
| 1933511 | 1/1971 | Fed. Rep. of Germany |
| 1955429 | 5/1971 | Fed. Rep. of Germany |
| 2758122 | 7/1972 | Fed. Rep. of Germany |
| 2165900 | 7/1973 | Fed. Rep. of Germany |
| 2165586 | 7/1973 | Fed. Rep. of Germany |
| 2221366 | 11/1973 | Fed. Rep. of Germany |
| 2502357 | 8/1975 | Fed. Rep. of Germany |
| 2843645 | 4/1980 | Fed. Rep. of Germany |
| 3017198 | 11/1981 | Fed. Rep. of Germany |
| 3136298 | 3/1983 | Fed. Rep. of Germany |
| 7120-060 | 6/1971 | Japan |
| 108132 | 7/1982 | Japan |
| 108133 | 7/1982 | Japan |
| 7108-133 | 7/1982 | Japan |
| 7108-132 | 7/1982 | Japan |
| 75-08587 | 1/1976 | Netherlands |
| 465200 | 4/1937 | United Kingdom |
| 718010 | 2/1953 | United Kingdom |
| 795771 | 5/1958 | United Kingdom |
| 825676 | 12/1959 | United Kingdom |
| 1111708 | 5/1968 | United Kingdom |
| 1296352 | 11/1972 | United Kingdom |
| 1524966 | 9/1978 | United Kingdom |
| 1563599 | 3/1980 | United Kingdom |
| 2070040 | 9/1981 | United Kingdom |
| 562568 | 7/1977 | U.S.S.R. |

OTHER PUBLICATIONS

Ethyleneamines from Union Carbide, p. 22, Nov., 1979.
Salamone et al., "Acrylic Ampholytic Ionomers," *Polymer*, vol. 23, (1982) pp. 843–848.
Drucker et al., "Amphoteric Polyelectrolytes: Copolymerization of Allyl Amine and Methacrylic Acid," *J. Am. Chem. Soc.*, vol. 78, (1956), pp. 346–347.

*Primary Examiner*—Prince E. Willis
*Attorney, Agent, or Firm*—Eric W. Guttag; Steven J. Goldstein; Jerry J. Yetter

[57] ABSTRACT

Water-soluble zwitterionic compounds having clay soil removal/anti-redeposition properties. The zwitterionic compounds are selected from monozwitterionic compounds, dizwitterionic compounds, polyzwitterionic compounds, and zwitterionic polymers. These zwitterionic compounds are useful in detergent compositions at from about 0.05 to about 95% by weight. In addition to the zwitterionic compounds, the detergent compositions further comprise from about 1 to about 75% by weight of a nonionic, anionic, ampholytic, zwitterionic, or cationic detergent surfactant or mixture thereof.

28 Claims, No Drawings

U.S. PATENT DOCUMENTS

| | | | |
|---|---|---|---|
| 3,510,521 | 5/1970 | Miller et al. | 260/583 |
| 3,513,183 | 5/1970 | Morehouse | 106/3 |
| 3,523,088 | 8/1970 | Dean et al. | 252/138 |
| 3,531,417 | 9/1970 | Morehouse | 252/312 |
| 3,531,507 | 9/1970 | Morehouse | 252/353 |
| 3,549,542 | 12/1970 | Holderby | 252/547 |
| 3,549,546 | 12/1970 | Moore | 252/152 |
| 3,573,091 | 3/1971 | Waldman et al. | 252/8.8 |
| 3,580,853 | 5/1971 | Parran | 252/152 |
| 3,597,416 | 8/1971 | Diehl | 536/31 |
| 3,622,518 | 11/1971 | Atherton et al. | 252/309 |
| 3,650,962 | 3/1972 | Werdehausen et al. | 252/102 |
| 3,650,963 | 3/1972 | Werdehausen et al. | 252/95 |
| 3,663,444 | 5/1972 | Schmadel | 252/DIG. 2 |
| 3,671,305 | 6/1972 | Brown et al. | 428/272 |
| 3,671,502 | 6/1972 | Samour et al. | 526/287 |
| 3,684,427 | 8/1972 | Walz et al. | 8/26 |
| 3,686,128 | 8/1972 | Monhelm et al. | 252/95 |
| 3,687,886 | 8/1972 | Distler et al. | 524/809 |
| 3,689,470 | 9/1972 | Schachat et al. | 260/86.1 N |
| 3,689,532 | 9/1972 | Emmons et al. | 260/910.6 |
| 3,694,364 | 9/1972 | Edwards | 8/191 |
| 3,719,647 | 3/1973 | Hardy et al. | 252/112 |
| 3,737,385 | 6/1973 | Werdehausen et al. | 252/95 |
| 3,769,398 | 10/1973 | Hewitt | 424/70 |
| 3,833,378 | 9/1974 | Hayashi et al. | 430/268 |
| 3,838,057 | 9/1974 | Barnes et al. | 252/117 |
| 3,839,393 | 10/1974 | Steckler | 162/158 |
| 3,864,317 | 2/1975 | Agata et al. | 260/DIG. 18 |
| 3,875,202 | 4/1975 | Steckler | 260/457 |
| 3,901,715 | 8/1975 | Callahan et al. | 106/2 |
| 3,925,262 | 12/1975 | Laughlin et al. | 252/526 |
| 3,929,678 | 12/1975 | Laughlin et al. | 252/526 |
| 3,936,503 | 2/1976 | Miller et al. | 252/8.6 |
| 3,959,230 | 5/1976 | Hays | 252/8.6 |
| 3,962,152 | 6/1976 | Nicol et al. | 252/DIG. 2 |
| 3,997,580 | 12/1976 | Morehouse | 252/8.7 |
| 4,000,091 | 12/1976 | Wentler | 252/542 |
| 4,000,092 | 12/1976 | Wentler | 252/526 |
| 4,003,870 | 1/1972 | Gibson et al. | 524/311 |
| 4,071,428 | 1/1978 | Bosso et al. | 204/181 |
| 4,097,420 | 6/1978 | Mikes et al. | 521/31 |
| 4,101,690 | 7/1978 | Miyamoto et al. | 427/150 |
| 4,110,176 | 8/1978 | Creutz et al. | 204/52 |
| 4,116,885 | 9/1978 | Derstadt et al. | 252/DIG. 15 |
| 4,118,324 | 10/1978 | Steckelberg et al. | 252/8.9 |
| 4,125,677 | 11/1978 | Graetz et al. | 106/316 |
| 4,132,657 | 1/1979 | Verdiccio et al. | 252/32.5 |
| 4,132,680 | 1/1979 | Nichol et al. | 8/137 |
| 4,134,970 | 1/1979 | Panka et al. | 424/70 |
| 4,138,371 | 2/1979 | Verdiccio et al. | 252/545 |
| 4,151,149 | 4/1979 | Smith | 156/182 |
| 4,152,272 | 5/1979 | Young | 252/8.8 |
| 4,159,277 | 6/1979 | Gosselink et al. | 260/458 R |
| 4,165,334 | 8/1979 | Gosselink et al. | 252/551 |
| 4,171,278 | 10/1979 | Andree et al. | 252/102 |
| 4,171,418 | 10/1979 | Barua et al. | 526/287 |
| 4,179,382 | 12/1979 | Rudkin et al. | 252/8.8 |
| 4,200,563 | 4/1980 | Komiya | 524/817 |
| 4,228,044 | 10/1980 | Cambre | 252/542 |
| 4,240,450 | 12/1980 | Grollier et al. | 132/7 |
| 4,246,387 | 1/1981 | Deutsch | 162/168.1 |
| 4,301,044 | 11/1981 | Wentler et al. | 252/545 |
| 4,305,718 | 12/1981 | Löffler et al. | 8/532 |
| 4,313,895 | 2/1982 | Richmond et al. | 106/273 |
| 4,330,450 | 5/1982 | Lipowski et al. | 524/547 |
| 4,372,882 | 2/1983 | Koster et al. | 252/529 |
| 4,551,506 | 11/1985 | Gosselink | 525/417 |
| 4,622,378 | 11/1986 | Gosselink | 528/66 |

ZWITTERIONIC COMPOUNDS HAVING CLAY SOIL REMOVAL/ANTI/REDEPOSITION PROPERTIES USEFUL IN DETERGENT COMPOSITIONS

This is a continuation of application Ser. No. 452,556, filed on Dec. 23, 1982, now abandoned.

TECHNICAL FIELD

The present application relates to zwitterionic compounds having clay-soil removal and anti-redeposition properties when used in detergent compositions.

A particularly important property of a detergent composition is its ability to remove particulate type soils from a variety of fabrics during laundering. Perhaps the most important particulate soils are the clay-type soils. Clay soil particles generally comprise negatively charged layers of aluminosilicates and positively charged cations (e.g. calcium) which are positioned between and hold together the negatively charged layers.

A variety of models can be proposed for compounds which would have clay soil removal properties. One model requires that the compound have two distinct characteristics. The first is the ability of the compound to adsorb onto the negatively charged layers of the clay particle. The second is the ability of the compound, once adsorbed, to push apart (swell) the negatively charge layers so that the clay particle loses its cohesive force and can be removed in the wash water.

One class of clay-soil removal compounds which appears to work according to this model are the polyethoxy zwitterionic surfactants disclosed in U.S. Pat. No. 4,301,044 to Wentler et al., issued Nov. 17, 1981. Representative of such compounds are those having the formula:

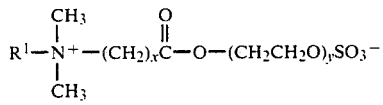

wherein $R^1$ is a $C_{14}$–$C_{20}$ alkyl group, x is 1 or an integer of from 3 to 5, and y is from 6 to 12. See also U.S. Pat. No. 3,929,678 to Laughlin et al., issued Dec. 30, 1975 (detergent composition containing polyethoxy zwitterionic surfactant plus other detergent surfactants); U.S. Pat. No. 3,925,262 to Laughlin et al., issued Dec. 9, 1975 (detergent composition containing polyethoxy zwitterionic surfactants with detergent builders); U.S. Pat. No. 4,157,227 to Gosselink et al., issued June 26, 1979 ($C_4$ polyoxyalkylene zwitterionic surfactants useful in detergent compositions); U.S. Pat. No. 4,165,334 to Gosselink et al., issued Aug. 21, 1979 (sulfonium-type polyethoxy zwitterionic surfactants).

These polyethoxy zwitterionic surfactants are generally compatible with other detergent surfactants such as the nonionic, zwitterionic and ampholytic types. However, as suggested in the Wentler et al. patent, most anionic surfactants interfere with the particulate soil removal performance of these compounds; anionic soils such as fatty acids likewise interfere. Because anionic detergent surfactants form the most important class of such materials for use in detergent compositions, the lack of compatibility between these polyethoxy zwitterionic surfactants and anionic surfactants poses a significant handicap where particulate (clay) soil removal is desired.

In addition to clay soil removal, one of the other properties mentioned in the Laughlin et al. patents with regard to these polyethoxy zwitterionic surfactants is the ability to keep the removed soil in suspension during the laundering cycle. Soil which is removed from the fabric and suspended in the wash water can redeposit onto the surface of the fabric. This redeposited soil causes a dulling or "graying" effect which is especially noticeable on white fabrics. Because soil is normally hydrophobic, this graying effect is a particularly important problem for those fabrics made in total or in part from hydrophobic fibers, e.g. polyester.

To minimize this problem, anti-redeposition or whiteness maintenance agents can be included in the detergent composition. Besides the previously mentioned polyethoxy zwitterionic surfactants, there are a variety of other compounds which can be used as anti-redeposition agents. One class of agents are the water-soluble copolymers of acrylic or methacrylic acid with acrylic or methacrylic acid-ethylene oxide condensates disclosed in U.S. Pat. No. 3,719,647 to Hardy et al., issued Mar. 6, 1973. Another class of anti-redeposition agents are the cellulose and carboxymethylcellulose derivatives disclosed in U.S. Pat. No. 3,597,416 to Diehl, issued Aug. 3, 1971 (ionic combination of dodecyltrimethyl phosphonium chloride and sodium carboxymethylcellulose), and U.S. Pat. No. 3,523,088 to Dean et al., issued Aug. 4, 1970 (combination of alkali metal carboxymethylcellulose and hydroxypropylcellulose). A mixture of compounds has also been used to provide not only anti-redeposition, but also clay soil removal properties. See U.S. Pat. No. 4,228,044 to Cambre, issued Oct. 14, 1980, which discloses detergent compositions having anti-redeposition and clay soil removal properties which can comprise a nonionic alkyl polyethoxy surfactant, a polyethoxy alkyl quaternary cationic surfactant and a fatty amide surfactant.

These anti-redeposition agents do have a number of significant handicaps. While effective to keep soil suspended, these compounds may lack additional clay soil removal properties. Moreover, as disclosed in the Diehl and Dean et al. patents, mixtures of compounds can be required to achieve the anti-redeposition benefit. To the extent that there are combined anti-redeposition/clay soil removal benefits as disclosed in the Cambre patent, mixtures of compounds are also required.

It is therefore an object of the present invention to provide compounds useful in detergent compositions which provide particulate soil, especially clay soil, removal benefits.

It is a further object of the present invention to provide compounds useful in detergent compositions which provide clay soil removal benefits and are anionic detergent surfactant compatible.

It is yet another object of the present invention to provide compounds useful in detergent compositions having anti-redeposition properties.

It is yet a further object of the present invention to provide compounds useful in detergent compositions which combine both clay soil removal and anti-redeposition properties.

These and further objects of the present invention are hereinafter disclosed.

BACKGROUND ART

U.S. Pat. No. 3,671,305 to Brown et al. issued June 20, 1972, discloses zwitterionic monomers which form polymers used to treat films, sheets, and filamentary materials so as to give them a durable, hydrophilic, anti-static, anti-soiling, soil releasing finish. These monomers have the formula:

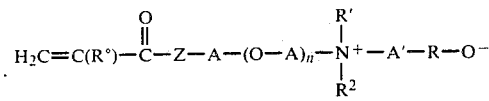

wherein n is 0 to 10; $R^0$ is hydrogen or methyl; Z is oxygen or $-N-$; A can be a $C_2$-$C_3$ alkylene group (e.g. ethylene) when n is 1-10; R' and $R^2$ can be $C_1$-$C_4$ alkyl; A' is $C_1$-$C_4$ alkylene; and R can be $SO_2$.

U.S. Pat. No. 3,671,502 to Samour et al. issued June 20, 1972, discloses co-polymers useful as binders in the production of non-wovens. These co-polymers consist essentially of from about 5 to about 90% of a monomer having the formula:

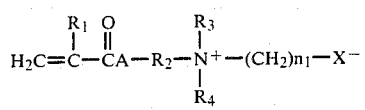

wherein $R_1$ is hydrogen or methyl; A is oxygen or $-NH-$; $R_2$ is ethylene, propylene, 2-hydroxypropylene or 2-acetoxypropylene; $R_3$ and $R_4$ are alkyl; $n_1$ is 1 to 4; and $X^-$ is $SO_3-$ or $CO_2-$; and from about 10 to about 95% by weight of a hydroxyacrylate such as a polyglycerol acrylate/methacrylate having the formula:

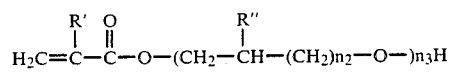

wherein R' is hydrogen or methyl; R'' is hydrogen, methyl or hydroxy; $n_2$ is 0 when R'' is hydrogen or methyl (e.g. an ethylene group); and $n_3$ is 2 to 4.

U.S. Pat. No. 3,838,057 to Barnes et al., issued Sept. 24, 1974, discloses toilet bars containing ethoxylated quaternary ammonium compounds, including ethoxylated, quaternized polyethyleneimines (PEIs) taught to be useful in the detergent, textile, and polymer industries, as anti-static and softening agents. These ethoxylated quaternized PEIs have the formula:

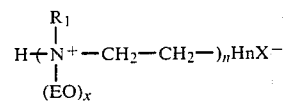

wherein $R_1$ is a compatible quaternary nitrogen substituent; n is at least 2; x is from 3 to 40; and $X^-$ is a compatible anion. Preferred compounds are those where $R_1$ is a $C_8$-$C_{22}$ alkyl group or the group:

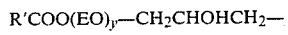

where R' is a $C_8$-$C_{22}$ alkyl group and y is from 3 to 40. See also U.S. Pat. No. 4,179,382 to Rudkin et al., issued Dec. 18, 1979; U.S. Pat. No. 4,152,272 to Young, issued May 1, 1979; and European Application No. 2,085 to Rudkin et al., published May 30, 1979, which disclose ethoxylated quaternized polyamines having $C_{10}$ to $C_{24}$ alkyl or alkenyl groups attached to one of the nitrogen atoms useful as fabric softeners.

U.S. Pat. No. 3,531,417 to Morehouse issued Sept. 29, 1970, discloses polysiloxanes having sulfonated polyoxyalkylene groups useful as wetting agents, emulsifiers and detergents. These siloxanes can be used in aqueous solutions at up to 20% by weight, and usually at 0.01 to 1% by weight. These siloxanes contain 1 to 100 mole % of units having the formula:

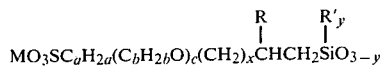

wherein M is a cation (e.g. sodium); R can be hydrogen; R' can be methyl; a can be 3; b can be 2 or 3; c is 1 to 100; x is 0 or 1; y can be 1; and d is 1 to 4. Example 1 discloses one such siloxane having the formula:

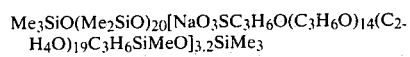

which was used as a detergent for soiled cotton (1% aqueous solution). See also U.S. Pat. No. 3,531,507 to Morehouse issued Sept. 29, 1970 (polysiloxanes having sulfonated or sulfated polyoxyalkylene groups useful as detergents); U.S. Pat. No. 3,513,183 to Morehouse issued May 19, 1970 (polysiloxanes having sulfated polyoxyalkylene groups useful as detergents); U.S. Pat. No. 3,997,580 to Morehouse issued Dec. 14, 1976 (polysiloxanes having sulfated polyoxyalkylene groups useful as detergents).

U.S. Pat. No. 3,875,202 to Steckler issued Apr. 1, 1975, discloses monomers useful in the preparation of co- or ter-polymeric films and fibers, and especially to build in anti-static properties. These monomers have the formula:

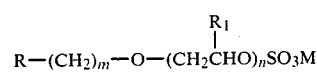

wherein R can be vinyl or allyl; $R_1$ is either hydrogen; methyl or ethyl; m is 1-10; n is either 0 or a number from 1 to 100; and M is either ammonium or an alkali metal. Example 11 discloses a co-polymer of an allyl polyethoxy sulfate (n equal to about 5) with vinylacetate. U.S. Pat. No. 3,839,393 to Steckler issued Oct. 1, 1974, discloses a similar monomer having the formula:

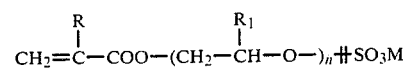

wherein R is either hydrogen or methyl; $R_1$ is either hydrogen or an alkyl of from 1-22 carbon atoms; n is 1 to 3 when $R_1$ is either hydrogen or an alkyl of 1-2 carbon atoms and M is either ammonium or an alkali metal. Example 8 discloses a polymer formed between one such monomer and styrene, N-butyl acrylate and methacrylic acid.

U.S. Pat. No. 3,301,783 to Dickson, et al., issued Jan. 31, 1967, discloses oxyalkylated, acylated, alkylated, carbonylated and olefinated derivatives of polyalkyleneimines, in particular polyethyleneimines (PEIs). For the oxyalkylated derivatives, the alkylene oxide (e.g. ethylene oxide) is reacted with the polyalkyleneimine in a mole ratio of from 1:1 to 1000:1, and preferably in a ratio of from 1:1 to 200:1. Among the ethoxylated PEIs disclosed are Examples 1-$O_7$ and 1-$O_8$ formed by condensing 105 and 200 moles, respectively, of ethylene oxide with a 900 M.W. PEI. The degree of ethoxylation calculates out to about 4.5 and about 8 ethoxy groups per reactive site, respectively. See also Examples 27-$O_5$ and 27-$O_6$ which disclose ethoxylated polypropyleneimines (M.W. 500) which have about 4 and about 8 ethoxy units per reactive site, respectively. Amongst the numerous disclosed uses of these polyalkyleneimine derivatives is a teaching that they are useful as detergents, softening agents, and anti-static agents. Preferred uses disclosed by this patent are as chelating agents, lubricating oil additives, emulsifying agents, and cutting oils.

U.S. Pat. No. 2,792,371 to Dickson, issued May 14, 1957, teaches a process for breaking petroleum emulsions with oxyalkylated tetraethylene pentaamines (TEPA). Ethoxylated TEPAs specifically disclosed include those having about 5 (Example 3aa), about 7 (Example 4aa), about 8.5 (Example 5a) and about 15.5 (Example Bc) ethoxy units per reactive site. Similarly, U.S. Pat. No. 2,792,370 to Dickson issued May 14, 1957, teaches a process for breaking petroleum emulsions with oxyalkylated triethylene tetramines (TETAs) including those having about 5.5 (Example 3aa), about 7.5 (Example 4aa), about 9 (Example 5a) and about 16.5 (Example Bc) ethoxy units per reactive site. See also U.S. Pat. No. 2,792,372 to Dickson, issued May 14, 1957, (oxyalkylated higher PEAs used to break petroleum emulsions); U.S. Pat. No. 2,792,369 to Dickson, issued May 14, 1957 (oxyalkylated diethylene triamines used to break petroleum emulsions).

U.S. Pat. No. 4,171,278 to Andree et al., issued Oct. 16, 1979, discloses cold water detergent compositions containing a detergent surfactant (e.g. anionic) and a hydroxyalkyl amine in a weight ratio of 100:1 to 1:1. The amine can have the formula:

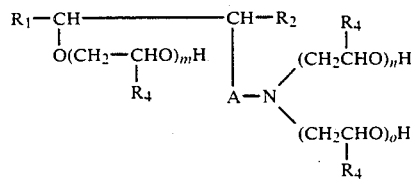

wherein $R_1$ is $C_1$-$C_{16}$ alkyl; $R_2$ is H or $C_1$-$C_{16}$ alkyl; $R_1+R_2$ have

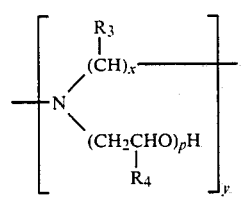

wherein $R_3$ is H or methyl; x is 2 to 6; y is 1 to 3; and p is 0 to 3; the sum of m to p being 1 to 5.5, and preferably 1 to 2. See also German Patent Document No. 2,165,900 to Henkel, published July 5, 1973, which discloses a washing agent for graying prevention formed by the reaction product of a PEI with an alkylglycidylether and ethylene oxide (2-hydroxyethyl moiety at each reactive site).

DISCLOSURE OF THE INVENTION

The present invention relates to water-soluble zwitterionic compounds having clay soil removal/anti-redeposition properties. These compounds are selected from the group consisting of:

(1) monozwitterionic compounds having the formula:

(2) dizwitterionic compounds having the formula:

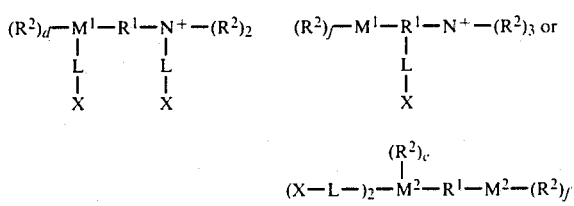

(3) polyzwitterionic compounds having the formula:

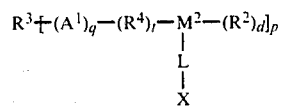

(4) zwitterionic polymers having the general formula:

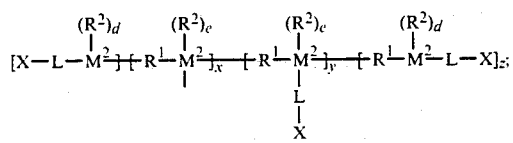

and (5) mixtures thereof wherein

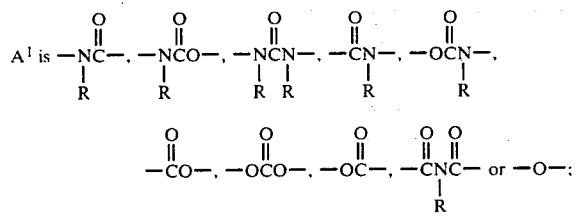

R is H or $C_1$-$C_4$ alkyl or hydroxyalkyl; $R^1$ is $C_2$-$C_{12}$ alkylene, hydroxyalkylene, alkenylene, arylene, alkarylene, or a $C_2$-$C_3$ oxyalkylene moiety having from 2 to about 20 oxyalkylene units provided that no O—N bonds are formed; each $R^2$ is $C_1$-$C_4$ alkyl or hydroxyalkyl, —($R^5$O)$_k$—R, the moiety —L—X, or two $R^2$ together form the moiety —(CH$_2$CH$_2$)$_r$—A$^2$—(CH$_2$CH$_2$)$_s$—, wherein $A^2$ is —O— or —CH$_2$—, r is 1 or 2, s is 1 or 2, and r+s is 3 or 4; $R^3$ is a substituted $C_3$-$C_{12}$ alkyl, hydroxyalkyl, alkenyl, aryl or alkaryl group having p substitution sites; $R^4$ is $C_1$-$C_{12}$ alkylene, hydroxyalkylene, alkenylene, arylene, alkarylene, or a $C_2$-$C_3$ oxyalkylene moiety having from 2 to about 20 oxyalkylene units provided no O—O or O—N bonds are formed; $R^5$ is $C_2$-$C_3$ alkylene or hydroxyalkylene; L is a hydrophilic chain which contains the polyoxyalkylene moiety —[($R^6$O)$_m$(CH$_2$CH$_2$O)$_n$]—, wherein $R^6$ is $C_3$-$C_4$ alkylene or hydroxyalkylene and m and n are numbers such that the moiety $-(CH_2CH_2O)_n-$ comprises at least about 50% by weight of said polyoxyalkylene moiety; $M^1$ is an $N^+$ or N group; each $M^2$ is an $N^+$ or N group and at least one $M^2$ is an $N^+$ group; X is an anionic group, or a mixture of anionic and nonionic groups; d is 2 when $M^1$ or $M^2$ is $N^+$ and is 1 when $M^1$ or $M^2$ is N; e is 1 when $M^2$ is $N^+$ and is 0 when $M^2$ is N; f is 3 when $M^2$ is $N^+$ and is 2 when $M^2$ is N; k is from 1 to about 100; for said monozwitterionic compounds, n is at least about 12; for said dizwitterionic compounds, n is at least about 6; for said polyzwitterionic compounds and zwitterionic polymers, n is at least about 3; p is from 3 to 8; q is 1 to 0; t is 1 or 0, provided that t is 1 when q is 1; w is 1 or 0; and $x+y+z$ is from 2 to 9.

The present invention further relates to detergent compositions which comprise from about 0.05 to about 95% by weight of these zwitterionic compounds or mixtures thereof. These detergent compositions further comprise from about 1 to about 75% by weight of a nonionic, anionic, ampholytic, zwitterionic, or cationic detergent surfactant, or mixture thereof. In addition to these detergent surfactants, the detergent compositions can optionally comprise from 0 to about 80% by weight of a detergent builder.

The zwitterionic compounds of the present invention provide clay soil removal benefits while being anionic detergent surfactant compatible. It is believed that the positively charged cationic groups cause adsorption of the compound onto the negatively charged layers of the clay particle. It is also believed that the hydrophilic ethoxy units of the compound swell the clay particle so that it loses its cohesive character and is swept away in the wash water. It is further believed that the negatively charged anionic groups attached to the hydrophilic chain aid in forcing apart the negatively charged layers of the clay particle.

The anti-redeposition benefits provided by these zwitterionic compounds are also believed to be due to the positively charged cationic groups which cause it to be adsorbed onto soil suspended in the wash water. As more and more of these compounds adsorb onto the suspended soil, it becomes encased within a hydrophilic layer provided by the attached ethoxy units. As such, the hydrophilically encased soil is prevented from redepositing on fabrics, in particular hydrophobic fabrics such as polyester, during the laundering cycle. Moreover, the negatively charged anionic groups are believed to aid in this process by keeping the encased soils from agglomerating into larger masses which could be trapped by the washed fabric.

Zwitterionic Compounds

The water-soluble zwitterionic compounds useful in detergent compositions of the present invention are selected from monozwitterionic compounds, dizwitterionic compounds, polyzwitterionic compounds, zwitterionic polymers and mixtures thereof as previously defined.

In the preceding formulas, R is preferably H. $R^1$ can be branched

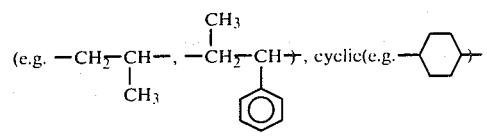

or most preferably linear

(e.g. $-CH_2CH_2-$, $-CH_2-CH_2-CH_2-$, $-CH_2-CH_{\overline{\hspace{-0.3em}|}}$)

alkylene, hydroxyalkylene, alkenylene, alkarylene or oxyalkylene. $R^1$ is preferably $C_2-C_6$ alkylene. For the zwitterionic polymers, in particular those derived from the polyalkyleneamines, $C_2-C_3$ alkylenes (ethylene, propylene) are preferred for $R^1$ with ethylene being most preferred. Each $R^2$ is preferably methyl or $-(R^5O)_k-H$; k is preferably from 2 to about 40. For the mono and dizwitterionic compounds, at least one $R^2$ is preferably $-(R^5O)_k-H$.

In the preceding formulas, hydrophilic chain L usually consists entirely of the polyoxyalkylene moiety $-[(R^6O)_m(CH_2CH_2O)_n]-$. The moieties $-(R^6O)_m-$ and $-(CH_2CH_2O)_n-$ of the polyoxyalkylene moiety can be mixed together or preferably form blocks of $-(R^6O)_m-$ and $-(CH_2CH_2O)_n-$ moieties. $R^6$ is preferably $C_3H_6$ (propylene); m is preferably from 0 to about 5 and is most preferably 0, i.e. the polyoxyalkylene moiety consists entirely of the moiety $-(CH_2CH_2O)_n-$. The moiety $-(CH_2CH_2O)_n-$ preferably comprises at least about 85% by weight of the polyoxyalkylene moiety and most preferably 100% by weight (m is 0).

In the preceding formulas, X can be any compatible anionic group, or a mixture of anionic and nonionic groups. Suitable anionic groups include $SO_3^-$, $OSO_3^-$, and $CO_2^-$. Particularly preferred anionic groups are $SO_3^-$ or $OSO_3^-$. Suitable nonionic groups include hydrogen (H), $C_1-C_4$ alkyl or hydroxyalkyl ester or ether groups, or mixtures thereof. The particularly preferred nonionic group is H. A mixture of from about 25 to 100% anionic groups and from 0 to about 75% nonionic groups is suitable. For the zwitterionic polymers, a mixture of from about 50 to 100% anionic groups and from 0 to about 50% nonionic groups is preferred.

The zwitterionic compounds of the present invention normally have a ratio of $N^+$ groups to anionic groups X of 1:1. However, by varying the number of $N^+$ and N groups, and the number anionic groups to nonionic groups for X, the ratio of $N^{30}$ groups to anionic groups can likewise be varied. The ratio of $N^+$ groups to anionic groups can usually range from about 1:2 to about 9:1. In preferred zwitterionic polymers, the ratio is from about 1:2 to about 4:1. For the di- and polyzwitterionic compounds, $M^1$ and each $M^2$ are typically an $N^+$ group. For the zwitterionic polymers, the $M^2$ groups are typically a mixture of from about 50 to 100% $N^+$ groups and from 0 to about 50% N groups.

Preferred ethoxylated mono- and dizwitterionic compounds have the formula:

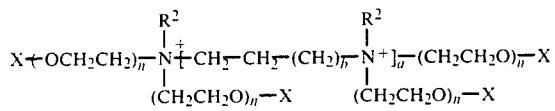

wherein $R^2$ (preferably methyl or $-(CH_2CH_2O)_n-X$), X, and n are defined as before, a is 0 or 1, and b is from 0 to 4 (e.g. ethylene, propylene, hexamethylene). For preferred monozwitterionic compounds (a=o), n is at least about 15, with a typical range of from about 15 to about 35. For preferred dizwitterionic compounds (a=1), n and k are each at least about 12 with a typical range of from about 12 to about 42.

In the preceding formula for the polyzwitterionic compounds, $R^3$ (linear, branched or cyclic) is preferably a substituted $C_3$-$C_6$ alkyl, hydroxyalkyl or aryl group; $A^1$ is preferably

n is preferably at least about 12, with a typical range of from about 12 to about 42; p is preferably from 3 to 6. When $R^3$ is a substituted aryl or alkaryl group, q is preferably 1 and $R^4$ is preferably $C_2$-$C_3$ alkylene. When $R^3$ is a substituted alkyl, hydroxyalkyl, or alkenyl group, and when q is 0, $R^4$ is preferably a $C_2$-$C_3$ oxyalkylene moiety; when q is 1, $R^4$ is preferably $C_2$-$C_3$ alkylene.

These polyzwitterionic compounds can be derived from polyaminoamides such as:

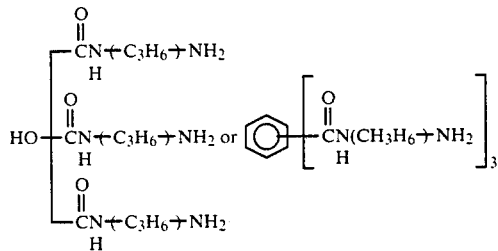

These polyzwitterionic compounds can also be derived for polyaminopropyleneoxides such as:

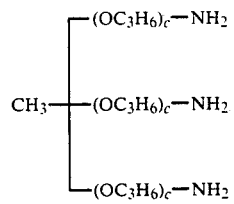

wherein c is a number from 2 to about 20.

Preferred zwitterionic polymers are derived from the $C_2$-$C_3$ polyalkyleneamines. Particularly preferred zwitterionic polyalkyleneamines are derived from the polyethyleneamines (PEAs). These preferred compounds comprise units having the general formula:

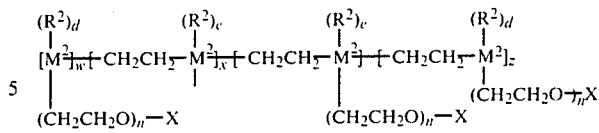

wherein $R^2$ (preferably methyl or $-(CH_2CH_2O)_k-H$), $M^2$, X, d, w, e, x, y, z and n are defined as before.

Prior to ethoxylation, the PEAs used in preparing compounds of the present invention have the following general formula:

wherein x+y+z is from 2 to 9 and w is 0 or 1 (molecular weight of from about 100 to about 400). Each hydrogen atom attached to each nitrogen atom represents an active site for subsequent ethoxylation. For preferred PEAs, x+y+z is from about 3 to about 7 (molecular weight of from about 140 to about 310). These PEAs can be obtained by reactions involving ammonia and ethylene dichloride, followed by fractional distillation. The common PEAs obtained are triethylenetetramine (TEPA). Above the pentamines, i.e., the hexamines, heptamines, octamines and possibly nonamines, the cogenerically derived mixture does not appear to separate by distillation and can include other materials such as cyclic amines and particualrly piperazines. There can also be present cyclic amines with side chains in which nitrogen atoms appear. See U.S. Pat. No. 2,792,372 to Dickson, issued May 14, 1957, which describes the preparation of PEAs.

The minimum degree of ethoxylation required for preferred clay soil removal/anti-redeposition performance can vary depending upon the number of units in the PEA. Where y+z is 2 or 3, n is preferably at least about 6. Where y+z is from 4 to 9, suitable benefits are achieved when n is at least about 3. For most preferred ethoxylated PEAs, n is at least about 12 with a typical range of from about 12 to about 42.

The level at which the zwitterionic compounds can be present in the detergent compositions of the present invention can vary depending upon the compounds used, the particular detergent formulation (liquid, granular) and the benefits desired. These compositions can be used as laundry detergents, laundry additives, and laundry pretreatments. Generally, the zwitterionic compounds can be included in an amount of from about 0.05 to about 95% by weight of the composition, with the usual range being from about 0.1 to about 10% by weight for laundry detergents. In terms of the benefits achieved, preferred detergent compositions can comprise from about 0.5 to about 5% by weight of the zwitterionic compounds of the present invention. Typically, these preferred compositions comprise from about 1 to about 3% by weight of these compounds. These compounds are normally present at a level that provides from about 2 ppm to about 200 ppm, preferably from about 10 ppm to about 100 ppm, of the compound in the wash solution at recommended U.S. usage levels, and normally from about 30 ppm to about 1000 ppm, preferably from about 50 ppm to about 500 ppm for European usage levels.

Method for Making Zwitterionic Compounds

A. Dizwitterionic Compound

Dizwitterionic compounds of the present invention can be prepared according to the following scheme:

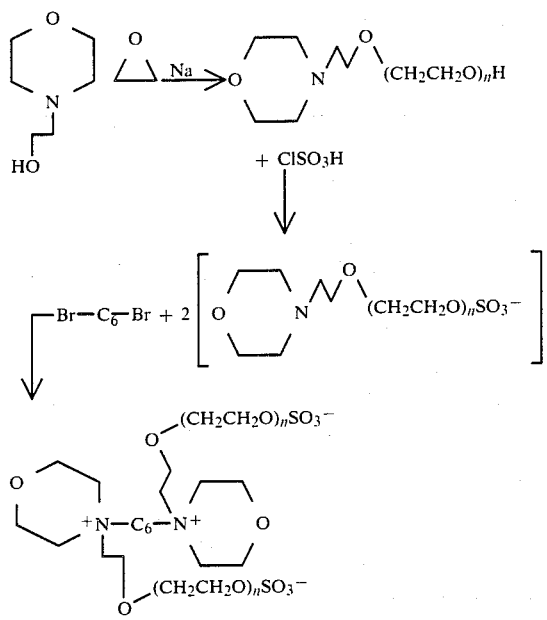

The synthesis of one such dizwitterionic compound is described as follows:

EXAMPLE 1

Step 1: Ethoxylation

A 100 g. portion (0.76 moles) of N-2-hydroxyethylmorpholine was placed in a flask equipped with mechanical stirrer, condenser, argon inlet, ethylene oxide sparger, and internal thermometer. After purging with argon, NaH (3.6 g., 0.15 moles) was added to the flask. The reaction mixture was stirred at 60° C. until the NaH had reacted. Ethylene oxide was then added with vigorous stirring while maintaining the temperature at about 80°–120° C. The reaction was stopped when the ethoxylated compound (about 538 g.) had a degree of ethoxylation of about 11.

Step 2: Sulfation

To about 50 g. of the ethoxylated compound of step 1 was added dichloromethane (150 ml.) with stirring until a homogeneous solution was obtained. The solution was cooled to about 15° C. and then chlorosulfonic acid (13.2 g., 0.11 moles) was added over a 15 minute period with swirling. After the reaction was essentially complete, the reaction mixture was poured with stirring into a NaOH solution (8 g., 0.2 moles) in ice and water to give a pH of about 9. This solution was extracted four times with dichloromethane and then dried over Na$_2$SO$_4$ to give the desired sulfated compound (53 g.).

Step 3: Quaternization

The sulfated compound (20 g., 0.03 moles) from step 2 was mixed with 3.7 g. (0.015 moles) of 1,6-dibromohexane. The reaction mixture was mixed, sealed in a jar, and heated to 80° C. for ten days to provide crude zwitterionic 1,6-bis(-N-morpholiniopolyethoxy(11)sulfate)-hexane.

B. Zwitterionic Polyethyleneamines

Zwitterionic polyethyleneamines can be prepared using standard methods for ethoxylating amines, with subsequent quaternization and sulfation. A representative synthesis of one such polyethyleneamine is as follows:

EXAMPLE 2

Step 1: Ethoxylation

Tetraethylenepentamine (TEPA) (M.W. 189, 13.5 g., 0.071 moles) was placed in a nominally dry flask and dried by stirring for 0.5 hrs. at 110°–120° C. under vacuum (pressure less than 1 mm Hg.). The vacuum was released by drawing ethylene oxide (EO) from a prepurged trap connected to a supply tank. Once the flask was filled with EO, an outlet stopcock was carefully opened to a trap connected to an exhaust bubbler. After 3 hrs. stirring at 115°–125° C., H-NMR analysis indicated the degree of ethoxylation 1 per reactive site. The reaction mixture was cooled while being swept with argon and 0.5 g. (0.0125 moles) of 60% sodium hydride in mineral oil was then added. The stirred reaction mixture was swept with argon until hydrogen evolution ceased. EO was then added to the mixture as a sweep under atmospheric pressure at 117°–135° C. with moderately fast stirring. After 31 hrs., 459 g. (10.43 moles) of EO had been added to give a calculated total degree of ethoxylation of 21.

Step 2: Quaternization

A portion of the ethoxylated TEPA from step 1 which was a brown waxy solid, specifically 34.8 g. (0.0052 moles) was dissolved in D$_2$O to give a 50% solution. The pH of the solution was about 8. The solution was heated to 60° C. and methyl bromide gas swept through the reaction vessel whose exit was connected to a bubbler. Several times during the reaction, the pH became acidic and NaHCO$_3$ was added to the reaction to maintain the pH at about 8. After about 20 hrs., a sweep bubbler was placed below the reaction mixture surface so that the methyl bromide was bubbled through the mixture while the stirring rate was increased. After a total of 22 hrs., the reaction mixture was diluted to 25% and dialized to remove salts. The reaction mixture was then freeze dried to give a pale yellowish tan crystalline solid as the quaternized ethoxylated TEPA.

Step 3: Sulfation

A portion of the quaternized ethoxylated TEPA from step 3, specifically 26.58 g. (F.W. c. 7129, 0.00373 moles) was dissolved in 106 ml of dichloromethane which had been dried over molecular sieves. 2.91 g. of chlorosulfonic acid was dissolved in about 20 ml of dried dichloromethane and dripped into the reaction mixture over 3.25 hrs. at room temperature. The reaction mixture was stirred at room temperature for an additional 3 hrs. The reaction mixture was then poured into 46.5 ml N NaOH and 30 g ice while swirling. The reaction mixture was then made more neutral by adding 13.5 ml N HCl pH=8. Dichloromethane was evaporated after which the aqueous mixture was dialized for 3 hrs. then diluted to 10% active aqueous solution containing the desired zwitterionic ethoxylated TEPA.

Detergent Surfactants

The amount of detergent surfactant included in the detergent compositions of the present invention can vary from about 1 to about 75% by weight of the composition depending upon the detergent surfactant(s) used, the type of composition to be formulated (e.g. granular, liquid) and the effects desired. Preferably, the detergent surfactant(s) comprises from about 10 to about 50% by weight of the composition. The detergent surfactant can be nonionic, anionic, ampholytic, zwitterionic, cationic, or a mixture thereof.

A. Nonionic Surfactants

Suitable nonionic surfactants for use in detergent compositions of the present invention are generally disclosed in U.S. Pat. No. 3,929,678 to Laughlin et al., issued Dec. 30, 1975 at column 13, line 14 through column 16, line 6 (herein incorporated by reference). Classes of nonionic surfactants included are:

1. The polyethyleneoxide condensates of alkyl phenols. These compounds include the condensation products of alkyl phenols having an alkyl group containing from about 6 to 12 carbon atoms in either a straight chain or branched chain configuration with ethylene oxide, the ethylene oxide being present in an amount equal to 5 to 25 moles of ethylene oxide per mole of alkyl phenol. The alkyl substituent in such compounds can be derived, for example, from polymerized propylene, diisobutylene, and the like. Examples of compounds of this type include nonyl phenol condensed with about 9.5 moles of ethylene oxide per mole of nonyl phenol; dodecylphenol condensed with about 12 moles of ethylene oxide per mole of phenol; dinonyl phenol condensed with about 15 moles of ethylene oxide per mole of phenol; and diisooctyl phenol condensed with about 15 moles of ethylene oxide per mole of phenol. Commercially available nonionic surfactants of this type include Igepal CO-630, marketed by the GAF Corporation, and Triton X-45, X-114, X-100, and X-102, all marketed by the Rohm & Haas Company.

2. The condensation products of aliphatic alcohols with from about 1 to about 25 moles of ethylene oxide. The alkyl chain of the aliphatic alcohol can either be straight or branched, primary or secondary, and generally contains from about 8 to about 22 carbon atoms. Examples of such ethoxylated alcohols include the condensation product of myristyl alcohol condensed with about 10 moles of ethylene oxide per mole of alcohol; and the condensation product of about 9 moles of ethylene oxide with coconut alcohol (a mixture of fatty alcohols with alkyl chains varying in length from 10 to 14 carbon atoms). Examples of commercially available nonionic surfactants of this type include Tergitol 15-S-9, marketed by Union Carbide Corporation, Neodol 45-9, Neodol 23-6.5, Neodol 45-7, and Neodol 45-4, marketed by Shell Chemical Company, and Kyro EOB, marketed by The Procter & Gamble Company.

3. The condensation products of ethylene oxide with a hydrophobic base formed by the condensation of propylene oxide with propylene glycol. The hydrophobic portion of these compounds has a molecular weight of from about 1500 to 1800 and exhibits water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include certain of the commercially available Pluronic surfactants, marketed by Wyandotte Chemical Corporation.

4. The condensation products of ethylene oxide with the product resulting from the reaction of propylene oxide and ethylenediamine. The hydrophobic moiety of these products consists of the reaction product of ethylenediamine and excess propylene oxide, the moiety having a molecular weight of from about 2500 to about 3000. This hydrophobic moiety is condensed with ethylene oxide to the extent that the condensation product contains from about 40% to about 80% by weight of polyoxyethylene and has a molecular weight of from about 5,000 to about 11,000. Examples of this type of nonionic surfactant include certain of the commercially available Tetronic compounds, marketed by Wyandotte Chemical Corporation.

5. Semi-polar nonionic detergent surfactants which include water-soluble amine oxides containing one alkyl moiety of from about 10 to 18 carbon atoms and 2 moieties selected from the group consisting of alkyl groups and hydroalkyl groups containing from 1 to about 3 carbon atoms; water-soluble phosphine oxides containing one alkyl moiety of from about 10 to 18 carbon atoms and 2 moieties selected from the group consisting of alkyl groups and hydroxyalkyl groups containing from about 1 to 3 carbon atoms; and water-soluble sulfoxides containing one alkyl moiety of from about 10 to 18 carbon atoms, and a moiety selected from the group consisting of alkyl and hydroxyalkyl moieties of from about 1 to 3 carbon atoms.

Preferred semi-polar nonionic detergent surfactants are the amine oxide detergent surfactants having the formula

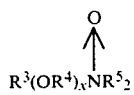

wherein $R^3$ is an alkyl, hydroxyalkyl, or alkyl phenyl group or mixtures thereof containing from about 8 to about 22 carbon atoms; $R^4$ is an alkylene or hydroxyalkylene group containing from 2 to 3 carbon atoms or mixtures thereof; x is from 0 to about 3; and each $R^5$ is an alkyl or hydroalkyl group containing from 1 to about 3 carbon atoms or a polyethylene oxide group containing from one to about 3 ethylene oxide groups. The $R^5$ groups can be attached to each other, e.g., through an oxygen or nitrogen atom to form a ring structure.

Preferred amine oxide detergent surfactants are $C_{10}$–$C_{18}$ alkyl dimethyl amine oxide and $C_8$–$C_{12}$ alkoxy ethyl dihydroxy ethyl amine oxide.

6. Alkylpolysaccharides disclosed in U.S. application Ser. No. 371,747 to Ramon A. Llenado, filed Apr. 26, 1982, having a hydrophobic group containing from about 6 to about 30 carbon atoms, preferably from about 10 to about 16 carbon atoms and a polysaccharide, e.g., a polyglycoside, hydrophilic group containing from about 1½ to about 10, preferably from about 1½ to about 3, most preferably from about 1.6 to about 2.7 saccharide units. Any reducing saccharide containing 5 or 6 carbon atoms can be used, e.g. glucose, galactose and galactosyl moieties can be substituted for the glucosyl moieties. (Optionally the hydrophobic group is attached at the 2, 3, 4, etc. positions thus giving a glucose or galactose as opposed to a glucoside or galactoside.) The intersaccharide bonds can be, e.g., between the one position of the additional saccharide units and the 2-, 3-, 4-, and/or 6 positions on the preceding saccharide units.

Optionally, and less desirably, there can be a polyalkyleneoxide chain joining the hydrophobic moiety and the polysaccharide moiety. The preferred alkyleneoxide is ethylene oxide. Typical hydrophobic groups include alkyl groups, either saturated or unsaturated, branched or unbranched containing from about 8 to about 18, preferably from about 10 to about 16, carbon atoms. Preferably, the alkyl group is a straight chain saturated alkyl group. The alkyl group can contain up to 3 hydroxy groups and/or the polyalkyleneoxide chain can contain up to about 10, preferably less than 5, most preferably 0, alkyleneoxide moieties. Suitable alkyl polysaccharides are octyl, nonyldecyl, undecyl-dodecyl, tridecyl, tetradecyl, pentadecyl, hexadecyl, heptadecyl, and octadecyl, di-, tri-, tetra-, penta-, and hexaglucosides, galactosides, lactosides, glucoses, fructosides, fructoses, and/or galactoses. Suitable mixtures include coconut alkyl, di-, tri-, tetra-, and pentaglucosides and tallow alkyl tetra-, penta-, and hexaglucosides.

The preferred alkylpolyglycosides have the formula $$R^2O(C_nH_{2n}O)_t(glycosyl)_x$$

wherein $R^2$ is selected from the group consisting of alkyl, alkylphenyl, hydroxyalkyl, hydroxyalkylphenyl, and mixtures thereof in which the alkyl groups contain from about 10 to about 18, preferably from about 12 to about 14, carbon atoms; n is 2 or 3, preferably 2; t is from 0 to about 10, preferably 0; and x is from 1½ to about 10, preferably about 1½ to about 3, most preferably from about 1.6 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-, 3-, 4- and/or 6-position, preferably predominately the 2-position.

7. Fatty acid amide detergent surfactants having the formula:

$$R^6-\overset{O}{\underset{\|}{C}}-NR^7_2$$

wherein $R^6$ is an alkyl group containing from about 7 to about 21 (preferably from about 9 to about 17) carbon atoms and each $R^7$ is selected from the group consisting of hydrogen, $C_1-C_4$ alkyl, $C_1-C_4$ hydroxyalkyl, and $-(C_2H_4O)_xH$ where x varies from about 1 to about 3.

Preferred amides are $C_8-C_{20}$ ammonia amides, monoethanolamides, diethanolamides, and isopropanol amides.

B. Anionic Surfactants

Anionic surfactants suitable in detergent compositions of the present invention are generally disclosed in U.S. Pat. No. 3,929,678 to Laughlin et al., issued Dec. 30, 1975 at column 23, line 58 through column 29, line 23 (herein incorporated by reference). Classes of anionic surfactants included are:

1. Ordinary alkali metal soaps such as the sodium, potassium, ammonium and alkylolammonium salts of higher fatty acids containing from about 8 to about 24 carbon atoms, preferably from about 10 to about 20 carbon atoms.

2. Water-soluble salts, preferably the alkali metal, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.)

Examples of this group of anionic surfactants are the sodium and potassium alkyl sulfates, especially those obtained by sulfating the higher alcohols ($C_8-C_{18}$ carbon atoms) such as those produced by reducing the glycerides of tallow or coconut oil; and the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11}-C_{13}LAS$.

Preferred anionic surfactants of this type are the alkyl polyethoxylate sulfates, particularly those in which the alkyl group contains from about 10 to about 22, preferably from about 12 to about 18 carbon atoms, and wherein the polyethoxylate chain contains from about 1 to about 15 ethoxylate moieties preferably from about 1 to about 3 ethoxylate moieties. These anionic detergent surfactants are particularly desirable for formulating heavy-duty liquid laundry detergent compositions.

Other anionic surfactants of this type include sodium alkyl glyceryl ether sulfonates, especially those ethers of higher alcohols derived from tallow and coconut oil; sodium coconut oil fatty acid monoglyceride sulfonates and sulfates; sodium or potassium salts of alkyl phenol ethylene oxide ether sulfates containing from about 1 to about 10 units of ethylene oxide per molecule and wherein the alkyl groups contain from about 8 to about 12 carbon atoms; and sodium or potassium salts of alkyl ethylene oxide ether sulfates containing about 1 to about 10 units of ethylene oxide per molecule and wherein the alkyl group contains from about 10 to about 20 carbon atoms.

Also included are water-soluble salts of esters of alphasulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; alkyl ether sulfates containing from about 10 to 20 carbon atoms in the alkyl group and from about 1 to 30 moles of ethylene oxide; water-soluble salts of olefin sulfonates containing from about 12 to 24 carbon atoms; and beta-alkyloxy alkane sulfonates containing from about 1 to 3 carbon atoms in the alkyl group and from about 8 to 20 carbon atoms in the alkane moiety.

3. Anionic phosphate surfactants.

4. N-alkyl substituted succinamates.

C. Ampholytic Surfactants

Ampholytic surfactants can be broadly described as aliphatic derivatives of secondary or tertiary amines, or aliphatic derivatives of heterocyclic secondary and tertiary amines in which the aliphatic radical can be straight chain or branched and wherein one of the aliphatic substituents contains from about 8 to 18 carbon atoms and at least one contains an anionic water-solubilizing group, e.g., carboxy, sulfonate, sulfate. See U.S. Pat. No. 3,929,678 to Laughlin et al., issued Dec. 30, 1975 at column 19, lines 18–35 (herein incorporated by reference) for examples of ampholytic surfactants.

D. Zwitterionic Surfactants

Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48 (herein incorporated by reference) for examples of zwitterionic surfactants.

E. Cationic Surfactants

Cationic surfactants can also be included in detergent compositions of the present invention. Suitable cationic surfactants include the quaternary ammonium surfactants having the formula:

$$[R^2(OR^3)_y][R^4(OR^3)_y]_2R^5N^+X^-$$

wherein $R^2$ is an alkyl or alkyl benzyl group having from about 8 to about 18 carbon atoms in the alkyl chain; each $R^3$ is selected from the group consisting of $-CH_2CH_2-$, $-CH_2CH(CH_3)-$, $-CH_2CH(CH_2OH)-$, $-CH_2CH_2CH_2-$, and mixtures thereof; each $R^4$ is selected from the group consisting of $C_1-C_4$ alkyl, $C_1-C_4$ hydroxyalkyl, benzyl, ring structures formed by joining the two $R^4$ groups, $-CH_2CHOHCHOHCOR^6CHOHCH_2OH$ wherein $R^6$ is any hexose or hexose polymer having a molecular weight less than about 1000, and hydrogen when y is not 0; $R^5$ is the same as $R^4$ or is an alkyl chain wherein the total number of carbon atoms of $R^2$ plus Rhu 5 is not more than about 18; each y is from 0 to about 10 and the sum of the y values is from 0 to about 15; and X is any compatible anion.

Preferred of the above are the alkyl quaternary ammonium surfactants, especially the mono-long chain alkyl surfactants described in the above formula when $R^5$ is selected from the same groups as $R^4$. The most preferred quaternary ammonium surfactants are the chloride, bromide and methylsulfate $C_8-C_{16}$ alkyl trimethylammonium salts, $C_8-C_{16}$ alkyl di(hydroxyethyl)methylammonium salts, the $C_8-C_{16}$ alkyl hydroxyethyldimethylammonium slats, and $C_8-C_{16}$ alkyloxypropyl trimethylammonium salts. Of the above, decyl trimethylammonium methylsulfate, lauryl trimethylammonium chloride, myristyl trimethylammonium bromide and coconut trimethylammonium chloride and methylsulfate are particularly preferred.

Detergent Builders

Detergent compositions of the present invention can optionally comprise inorganic or organic detergent builders to assist in mineral hardness control. These builders can comprise from 0 to about 80% by weight of the composition. When included, these builders typically comprise up to about 60% by weight of the detergent composition. Built liquid formulations preferably comprise from about 10 to about 25% detergent builder while built granular formulations preferably comprise from about 10 to about 50% by weight detergent builder.

Suitable detergent builders include crystalline aluminosilicate ion exchange materials having the formula:

$$Na_z[(AlO_2)_z\cdot(SiO_2)_y]\cdot xH_2O$$

wherein z and y are at least about 6, the mole ratio of z to y is from about 1.0 to about 0.5; and x is from about 10 to about 264. Amorphous hydrated aluminosilicate materials useful herein have the empirical formula $$M_z(zAlO_2\cdot ySiO_2)$$

wherein M is sodium, potassum, ammonium or substituted ammonium, z is from about 0.5 to about 2; and y is 1; this material having a magnesium ion exchange capacity of at least about 50 milligram equivalents of $CaCO_3$ hardness per gram of anhydrous aluminosilicate.

The aluminosilicate ion exchange builder materials are in hydrated form and contain from about 10% to about 28% of water by weight if crystalline, and potentially even higher amounts of water if amorphous. Highly preferred crystalline aluminosilicate ion exchange materials contain from about 18% to about 22% water in their crystal matrix. The preferred crystalline aluminosilicate ion exchange materials are further characterized by a particle size diameter of from about 0.1 micron to about 10 microns. Amorphous materials are often smaller, e.g., down to less than about 0.01 micron. More preferred ion exchange materials have a particle size diameter of from about 0.2 micron to about 4 microns. The term "particle size diameter" represents the average particle size diameter of a given ion exchange material as determined by conventional analytical techniques such as, for example, microscopic determination utilizing a scanning electron microscope. The crystalline aluminosilicate ion exchange materials are usually further characterized by their calcium ion exchange capacity, which is at least about 200 mg. equivalent of $CaCO_3$ water hardness/g. of aluminosilicate, calculated on an anhydrous basis, and which generally is in the range of from about 300 mg. eq./g. to about 352 mg. eq./g. The aluminosilicate ion exchange materials are still further characterized by their calcium ion exchange rate which is at least about 2 grains $Ca^{++}$/gallon/minute/gram/gallon of aluminosilicate (anhydrous basis), and generally lies within the range of from about 2 grains/gallon/minute/gram/gallon to about 6 grains/gallon/minute/gram/gallon, based on calcium ion hardness. Optimum aluminosilicates for builder purposes exhibit a calcium ion exchange rate of at least about 4 grains/gallon/minute/gram/gallon.

The amorphous aluminosilicate ion exchange materials usually have a $Mg^{++}$ exchange capacity of at least about 50 mg. eq. $CaCO_3$/g. (12 mg $Mg^{++}$/g.) and a $Mg^{++}$ exchange rate of at least about 1 grain/gallon/minute/gram/gallon. Amorphous materials do not exhibit an observable diffraction pattern when examined by Cu radiation (1.54 Angstrom Units).

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669 to Krummel, et al. issued Oct. 12, 1976 (herein incorporated by reference). Preferred synthetic crystalline aluminosilicate ion exchange materials useful herein are available under the designations Zeolite A, Zeolite P (B), and Zeolite X. In an especially preferred embodiment, the crystalline aluminosilicate ion exchange material has the formula $$Na_{12}[(AlO_2)_{12}(SiO_2)_{12}]\cdot xH_2O$$

wherein x is from about 20 to about 30, especially about 27.

Other examples of detergency builders include the various water-soluble, alkali metal, ammonium or substituted ammonium phosphates, polyphosphates, phosphonates, polyphosphonates, carbonates, silicates, borates, polyhydroxysulfonates, polyacetates, carboxylates, and polycarboxylates. Preferred are the alkali metal, especially sodium, salts of the above.

Specific examples of inorganic phosphate builders are sodium and potassium tripolyphosphate, pyrophosphate, polymeric metaphate having a degree of polymerization of from about 6 to 21, and orthophosphate. Examples of polyphosphonate builders are the sodium and potassium salts of ethylene-1,1-diphosphonic acid, the sodium and potassium salts of ethane 1-hydroxy-1,1-diphosphonic acid and the sodium and potassium salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148 (all herein incorporated by reference).

Examples of nonphosphorus, inorganic builders are sodium and potassium carbonate, bicarbonate, sesquicarbonate, tetraborate decahydrate, and silicate having a mole ratio of $SiO_2$ to alkali metal oxide of from about 0.5 to about 4.0, preferably from about 1.0 to about 2.4.

Useful water-soluble, nonphosphorus organic builders include the various alkali metal, ammonium and substituted ammonium polyacetates, carboxylates, polycarboxylates and polyhydroxysulfonates. Examples of polyacetate and polycarboxylate builders are the sodium, potassium lithium, ammonium and substituted ammonium salts of ethylenediamine tetraacetic acid, nitrilotriacetic acid, oxydisuccinic acid, mellitic acid, benzene polycarboxylic acids, and citric acid.

Highly preferred polycarboxylate builders are disclosed in U.S. Pat. No. 3,308,067 to Diehl, issued Mar. 7, 1967 (herein incorporated by reference). Such materials include the watersoluble salts of homo- and copolymers of aliphatic carboxylic acids such as maleic acid, itaconic acid, mesaconic acid, fumaric acid, aconitic acid, citraconic acid and methylenemalonic acid.

Other builders include the carboxylated carbohydrates disclosed in U.S. Pat. No. 3,723,322 to Diehl issued Mar. 28, 1973 (herein incorporated by reference).

Other useful builders are sodium and potassium carboxymethyloxysuccinate, cis-cyclohexanehexacarboxylate, cis-cyclopentanetetracarboxylate phloroglucinol trisulfonate, water-soluble polyacrylates (having molecular weights of from about 2,000 to about 200,000 for example), and the copolymers of maleic anhydride with vinyl methyl ether or ethylene.

Other suitable polycarboxylates are the polyacetal carboxylates disclosed in U.S. Pat. No. 4,144,226, to Crutchfield et al. issued Mar. 13, 1979, and U.S. Pat. No. 4,246,495, to Crutchfield et al., issued Mar. 27, 1979 (both herein incorporated by reference). These polyacetal carboxylates can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and added to a surfactant.

Other useful detergency builder materials are the "seeded builder" compositions disclosed in Belgian Pat. No. 798,856, issued Oct. 29, 1973, (herein incorporated by reference). Specific examples of such seeded builder mixtures are: 3:1 wt. mixtures of sodium carbonate and calcium carbonate having 5 micron particle diameter; 2.7:1 wt. mixtures of sodium sesquicarbonate and calcium carbonate having a particle diameter of 0.5 microns; 20:1 wt. mixtures of sodium sesquicarbonate and calcium hydroxide having a particle diameter of 0.01 micron; and a 3:3:1 wt. mixture of sodium carbonate, sodium aluminate and calcium oxide having a particle diameter of 5 microns.

Other Optional Detergent Ingredients

Other optional ingredients which can be included in detergent compositions of the present invention, in their conventional art-established levels for use (i.e., from 0 to about 20%), include solvents, bleaching agents, bleach activators, soil-suspending agents, corrosion inhibitors, dyes, fillers, optical brighteners, germicides, pH adjusting agents (monoethanolamine, sodium carbonate, sodium hydroxide, etc.), enzymes, enzyme-stabilizing agents, perfumes, fabric softening components, static control agents, and the like.

Detergent Formulations

Granular formulations embodying the detergent compositions of the present invention can be formed by conventional techniques, i.e., by slurrying the individual components in water and then atomizing and spray-drying the resultant mixture, or by pan or drum granulation of the ingredients. Granular formulations preferably comprise from about 10 to about 30% detergent surfactant, usually anionic.

Liquid formulations embodying the detergent compositions can be built or unbuilt. If unbuilt, these compositions conventionally contain approximately 15 to 50% total surfactant, from 0 to 10% of an organic base such as a mono-, di-, or tri-alkanol amine, a neutralization system such as an alkali metal hydroxide and a lower primary alcohol such as ethanol or isopropanol, and approximately 20 to 80% water. Such compositions are normally homogeneous single phase liquids of low viscosity (approximately 100 to 150 centipoise at 75° F.).

Built liquid detergent compositions can be in the form of single phase liquids provided that the builder is solubilized in the mixture at its level of use. Such liquids conventionally contain 10 to 25% total surfactant, 10 to 25% builder which can be organic or inorganic, 3 to 10% of a hydrotrope system and 40 to 77% water. Liquids of this type also have a low viscosity (100 to 150 centipoise at 75° F.). Built liquid detergents incorporating components that form heterogeneous mixtures (or levels of builder that cannot be completely dissolved) can also comprise detergent compositions of the present invention. Such liquids conventionally employ viscosity modifiers to produce systems having plastic shear characteristics to maintain stable dispersions and to prevent phase separation or solid settlement.

Near Neutral Wash pH Detergent Formulations

While the detergent compositions of the present invention are operative within a wide range of wash pHs (e.g. from about 5 to about 12), they are particularly suitable when formulated to provide a near neutral wash pH, i.e. an initial pH of from about 6.0 to about 8.5 at a concentration of from about 0.1 to about 2% by weight in water at 20° C. Near neutral wash pH formulations are better for enzyme stability and for preventing stains from setting. In such formulations, the wash pH is preferably from about 7.0 to about 8.5, and more preferably from about 7.5 to about 8.0.

Preferred near neutral wash pH detergent formulations are disclosed in U.S. application Ser. No. 380,988 to J. H. M. Wertz and P. C. E. Goffinet, filed May 24, 1982. These preferred formulations comprise:

(a) from about 2 to about 60% (preferably from about 10 to about 25%) by weight of an anionic synthetic surfactant as previously defined;

(b) from about 0.25 to about 12% (preferably from about 1 to about 4%) by weight of a cosurfactant selected from the group consisting of:

(i) quaternary ammonium surfactants having the formula:

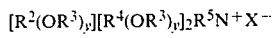

wherein $R^2$, each $R^3$, $R^4$, $R^5$, X and y are as previously defined;

(ii) diquaternary ammonium surfactants having the formula:

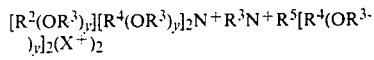

wherein $R^2$, $R^3$, $R^4$, y and X are as defined above; particularly preferred are the $C_8$–$C_{16}$ alkyl pentamethylethylenediamine chloride, bromide and methylsulfate salts;

(iii) amine surfactants having the formula:

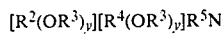

wherein $R^2$, $R^3$, $R^4$, $R^5$ and y are as defined above; particularly preferred are the $C_{12}$–$C_{16}$ alkyl dimethyl amines;

(iv) diamine surfactants having the formula:

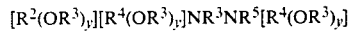

wherein $R^2$, $R^3$, $R^4$, $R^5$ and y are as defined above; particularly preferred are the $C_{12}$–$C_{16}$ alkyl dimethyl diamines;

(v) amine oxide surfactants having the formula:

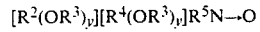

wherein $R^2$, $R^3$, $R^4$, $R^5$ and y are as defined above; particularly preferred are the $C_{12}$–$C_{16}$ alkyl-dimethyl amine oxides; and (vi) di(amine oxide) surfactants having the formula:

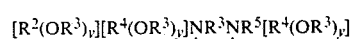

wherein $R^2$, $R^3$, $R^4$, $R^5$ and y are as defined above; preferred are the $C_{12}$–$C_{16}$ alkyl trimethylethylene di(amine oxides) and (c) from about 5% to about 40% by weight (preferably 7 to about 30% by weight, and most preferably from about 10 to 20% by weight) of a fatty acid containing from about 10 to about 22 carbon atoms (preferably a $C_{10}$–$C_{14}$ saturated fatty acid or mixture thereof); the mole ratio of the anionic surfactant to the cosurfactant being at least 1 and preferably from about 2:1 to about 20:1.

Such compositions also preferably contain from about 3 to about 15% by weight of an ethoxylated alcohol or ethoxylated alkyl phenol (nonionic surfactants) as previously defined. Highly preferred compositions of this type also preferably contain from about 2 to about 10% of weight of citric acid and minor amounts (e.g., less than about 20% by weight) of neutralizing agents, buffering agents, phase regulants, hydrotropes, enzymes, enzyme stabilizing agents, polyacids, suds regulants, opacifiers, anti-oxidants, bactericides, dyes, perfumes and brighteners, such as those described in U.S. Pat. No. 4,285,841 to Barrat et al., issued Aug. 25, 1981 (herein incorporated by reference).

Specific Embodiments of Detergent Compositions According to the Present Invention Embodiment I The following embodiments illustrate, but are not limiting of, detergent compositions of the present invention:

| Component | Wt. % |
|---|---|
| Quat PEA$_{189}$E$_{24}$ Sulfate* | 1.0 |
| Sodium $C_{14}$–$C_{15}$ alkylethoxysulfate | 10.7 |
| $C_{13}$ linear alkyl benzene sulfonic acid | 4.3 |
| $C_{12}$–$C_{14}$ alkylpolyethoxylate (6) | 0.5 |
| Sodium toluene sulfonate | 1.0 |
| Sodium tripolyphosphate | 32.9 |
| Sodium carbonate | 20.3 |
| Sodium silicate | 5.8 |
| Minors and water | Balance to 100 |

*PEA having M.W. of 189, degree of ethoxylation of 24, quaternized with methyl bromide, sulfated with chlorosulfonic acid.

The components are added together with continuous mixing to form an aqueous slurry which is then spray dried to form the composition.

Embodiment II

A liquid detergent composition is as follows:

| Component | Wt. % |
|---|---|
| Quat PEA$_{189}$E$_{24}$ sulfate | 1.0 |
| Sodium $C_{14}$–$C_{15}$ alkyl polyethoxy (2.5) sulfate | 8.3 |
| $C_{12}$–$C_{14}$ alkyl dimethyl amine oxide | 3.3 |
| Sodium toluene sulfonate | 5.0 |
| Monoethanolamine | 2.3 |
| Sodium nitrilotriacetate | 18.2 |
| Minors and water | Balance to 100 |

The components are added together with continuous mixing to form the composition.

Embodiments III and IV

Liquid detergent compositions are as follows:

| Component | Wt. % III | Wt. % IV |
|---|---|---|
| Quat PEA$_{189}$E$_{24}$ sulfate | 1.5 | 1.5 |
| $C_{14}$–$C_{15}$ alkylethoxysulfate | 10.8 | — |
| $C_{14}C_{15}$ alkylpolyethoxy (2.25) sulfuric acid | — | 10.8 |
| $C_{13}$ linear alkylbenzene sulfonic acid | 7.2 | 7.2 |
| $C_{12}$ alkyl trimethylammonium chloride | 1.2 | 1.2 |
| $C_{12}$–$C_{13}$ alcohol polyethoxylate (6.5) | 6.5 | 6.5 |
| Coconut fatty acid | 15.0 | 15.0 |
| Citric acid monohydrate | 6.9 | 4.0 |
| Diethylenetriamine pentaacetic acid | 0.9 | 0.9 |

| | Wt. % | |
|---|---|---|
| Component | III | IV |
| Protease enzyme | 0.8 | 0.8 |
| Amylase enzyme | 0.3 | 0.3 |
| Monoethanolamine | 13.6 | 2.0 |
| Triethanolamine | 3.0 | 4.0 |
| Sodium hydroxide | — | 2.0 |
| Potassium hydroxide | — | 2.8 |
| 1,2-Propanediol | 5.0 | 5.0 |
| Ethanol | 3.0 | 7.0 |
| Sodium formate | 1.0 | 1.0 |
| Sodium toluene sulfonate | 5.0 | — |
| Minors and water | Balance to 100 | |

Embodiment IV is prepared by adding the components together with continuous mixing, in the following order to produce a clear liquid: a paste premix of the alkylbenzene sulfonic acid, 0.9 parts of the sodium hydroxide, propylene glycol, and 2.3 parts of the ethanol; a paste premix of the alkylpolyethoxysulfuric acid, 1.1 parts of the sodium hydroxide and 3.1 parts of the ethanol; alcohol polyethoxylate; premix of monoethanolamine, triethanolamine and brighteners, 1.5 parts potassium hydroxide; balance of the ethanol; citric acid; formate; 1.4 parts potassium hydroxide; fatty acid; pentaacetic acid; alkyl trimethylammonium chloride; adjust pH to about 8.4 with potassium hydroxide, water or citric acid; enzymes; Quat PEA (50% aqueous solution); and perfume. Embodiment III can be prepared in a similar manner.

Embodiment V

A liquid detergent composition is formulated as follows:

| Component | Wt. % |
|---|---|
| Quat PEA$_{189}$E$_{24}$ sulfate | 1.0 |
| Sodium C$_{12}$ alkylpolyethoxy (3) sulfate | 12.6 |
| C$_{12}$—C$_{13}$ alcohol polyethoxylate (6.5) | 23.4 |
| Monoethanolamine | 2.0 |
| Ethanol | 9.0 |
| Citric acid monohydrate | 0.8 |
| Minors and water | Balance to 100 |

The components are added together with continuous mixing to form the composition.

What is claimed is:

1. A water-soluble zwitterionic compound having clay soil removal/anti-redeposition properties selected from the group consisting of:

(1) dizwitterionic compounds having the formula:

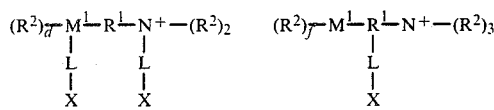

or

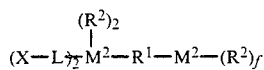

(2) polyzwitterionic compounds having the formula:

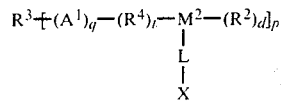

(3) zwitterionic polymers having the general formula:

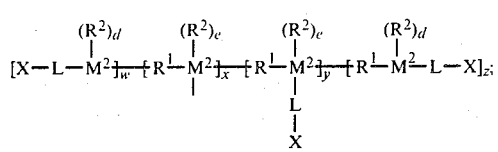

and (4) mixtures thereof wherein A$^1$ is

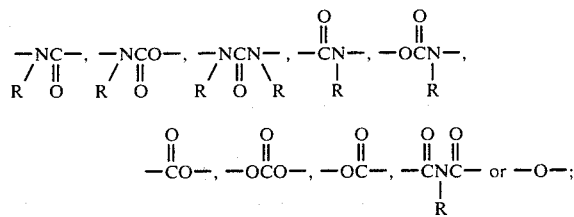

R is H or C$_1$-C$_4$ alkyl or hydroxyalkyl; R$^1$ is C$_2$-C$_{12}$ alkylene, hydroxyalkylene, alkenylene, arylene, alkarylene, or a C$_2$-C$_3$ oxyalkylene moiety having from 2 to about 20 oxyalkylene units provided that no O—N bonds are formed; each R$^2$ is C$_1$-C$_4$ alkyl or hydroxyalkyl, —(R$^5$O)$_k$—H, the moiety —L—X, or two R$^2$ together form the moiety —(CH$_2$CH$_2$)$_r$—A$^2$—(CH$_2$CH$_2$)$_s$—, wherein A$^2$ is —O— or —CH$_2$—, r is 1 or 2, s is 1 or 2, and r+s is 3 or 4; R$^3$ is a substituted C$_3$-C$_{12}$ alkyl, hydroxyalkyl, alkenyl, aryl or alkaryl group having p substitution sites; R$^4$ is C$_1$-C$_{12}$ alkylene, hydroxyalkylene, alkenylene, arylene, alkarylene, or a C$_2$-C$_3$ oxyalkylene moiety having from 2 to about 20 oxyalkylene units provided no O—O or O—N bonds are formed; R$^5$ is C$_2$-C$_3$ alkylene or hydroxyalkylene; L is a hydrophilic chain which contains the polyoxyalkylene moiety —[(R$^6$O)$_m$(CH$_2$CH$_2$O)$_n$]—, wherein R$^6$ is C$_3$-C$_4$ alkylene or hydroxyalkylene and m and n are numbers such that the moiety —(CH$_2$CH$_2$O)$_n$— comprises at least about 50% by weight of said polyoxyalkylene moiety; M$^1$ is an N$^+$ or N group; each M$^2$ is an N$^+$ or an N group and at least one M$^2$ is an N$^+$ group; X is the anionic group SO$_3^-$ or a mixture of said anionic group and the nonionic group H; d is 2 when M$^1$ or M$^2$ is N$^+$ and is 1 when M$^1$ or M$^2$ is N; e is 1 when M$^2$ is N$^+$ and 0 when M$^2$ is N; f is 3 when M$^2$ is N$^+$ and is 2 when M$^2$ is N; k is from 1 to about 100; for said dizwitterionic compounds, n is at least about 6; for said polyzwitterionic compounds and zwitterionic polymers, n is at least about 3; p is from 3 to 8; q is 1 or 0; t is 1 or 0, provided t is 1 when q is 1; w is 1 or 0; and x+y+z is from 2 to 9.

2. A compound according to claim 1 wherein R$^1$ is C$_2$-C$_6$ alkylene.

3. A compound according to claim 2 wherein R$^1$ is C$_2$-C$_3$ alkylene.

4. A compound according to claim 2 wherein each R$^2$ is methyl or —(R$^5$O)$_k$—H.

5. A compound according to claim 4 wherein m and n are numbers such that the moiety —(CH$_2$CH$_2$O)$_n$— comprises at least about 85% by weight of said polyoxyalkylene moiety.

6. A compound according to claim 5 wherein X is a mixture from about 25 to 100% SO$_3^-$ groups and from 0 to about 75% H groups.

7. A compound according to claim 6 which is an ethoxylated dizwitterionic compound.

8. A compound according to claim 7 wherein M$^1$ and each M$^2$ are an N+ group.

9. A compound according to claim 8 wherein m is 0 and n is at least about 12.

10. A compound according to claim 2 which is an ethoxylated zwitterionic polymer and R$^1$ is C$_2$–C$_3$ alkylene.

11. A compound according to claim 10 wherein the M$^2$ groups are a mixture of from about 50 to 100% N+ groups and from 0 to about 50% N groups.

12. A compound according to claim 11 wherein R$^1$ is ethylene and x+y+z is from 3 to 7.

13. A compound according to claim 12 wherein m is 0 and n is at least about 12.

14. A compound according to claim 1 which is an ethoxylated polyzwitterionic compound.

15. A compound according to claim 14 wherein R$^3$ is a substituted C$_3$–C$_6$ alkyl, hydroxyalkyl or aryl group; A$^1$ is

p is from 3 to 6.

16. A compound according to claim 15 wherein each M$^2$ is an N+ group.

17. A compound according to claim 16 wherein m is 0 and n is at least about 12.

18. A detergent composition, which comprises:
   (a) from about 1 to about 75% by weight of a detergent surfactant selected from the group consisting of nonionic, anionic, ampholytic, zwitterionic and cationic surfactants and mixtures thereof; and
   (b) from about 0.05 to about 95% by weight of a water-soluble zwitterionic compound having clay soil removal/anti-redeposition properties selected from the group consisting of:
   (1) dizwitterionic compounds having the formula:

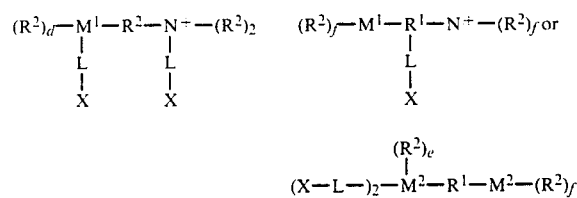

(2) polyzwitterionic compounds having the formula:

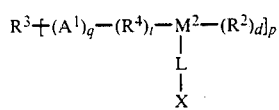

(3) zwitterionic polymers having the general formula:

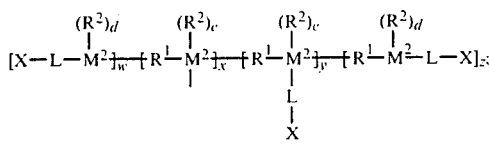

and
   (4) mixtures thereof wherein A$^1$ is

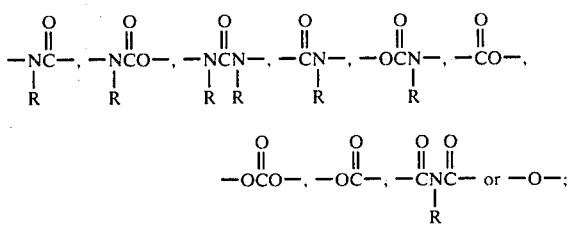

R is H or C$_1$–C$_4$ alkyl or hydroxyalkyl; R$^1$ is C$_2$–C$_{12}$ alkylene, hydroxyalkylene, alkenylene, arylene, alkarylene, or a C$_2$–C$_3$ oxyalkylene moiety having from 2 to about 20 oxyalkylene units provided that no O—N bonds are formed; each R$^2$ is C$_1$–C$_4$ alkyl or hydroxyalkyl, —(R$^5$O)$_k$—H, the moiety —L—X or two R$^2$ together form the moiety —(CH$_2$CH$_2$)$_r$—A$^2$—(CH$_2$CH$_2$)$_s$—, wherein A$^2$ is —O— or —CH$_2$—, r is 1 or 2, s is 1 or 2, and r+s is 3 or 4; R$^3$ is a substituted C$_3$–C$_{12}$ alkyl, hydroxyalkyl, alkenyl, aryl or alkaryl group having p substitution sites; R$^4$ is C$_1$–C$_{12}$ alkylene, hydroxyalkylene, alkenylene, arylene, alkarylene, or a C$_2$–C$_3$ oxyalkylene moiety having from 2 to about 20 oxyalkylene units provided no O—O or O—N bonds are formed; R$^5$ is C$_2$–C$_3$ alkylene or hydroxyalkylene; L is a hydrophilic chain which contains the polyoxyalkylene moiety —[(R$^6$O)$_m$(CH$_2$CH$_2$O)$_n$]—, wherein R$^6$ is C$_3$–C$_4$ alkylene or hydroxyalkylene and m and n are number such that the moiety —(CH$_2$CH$_2$O)$_n$— comprises at least about 50% by weight of said polyoxyalkylene moiety; M$^1$ is an N+ or N group; each M$^2$ is an N+ or N group and at least one M$^2$ is an N+ group; X is the anionic group SO$_3^-$ or a mixture of said anionic group and the nonionic group H; d is 2 when M$^1$ or M$^2$ is N+ and is 1 when M$^1$ or M$^2$ is N; e is 1 when M$^2$ is N+ and is 0 when M$^2$ is N; f is 3 when M$^2$ is N+ and is 2 when M$^2$ is N; k is from 2 to about 100; for said dizwitterionic compounds, n is at least about 6; for said polyzwitterionic compounds and zwitterionic polymers, n is at least about 3; p is from 3 to 8; q is 1 or 0; t is 1 or 0, provided that t is 1 when q is 1; w is 1 or 0; and x+y+z is from 2 to 9.

19. A composition according to claim 18 wherein said zwitterionic comprises from about 0.1 to about 10% by weight of the composition.

20. A composition according to claim 19 wherein said detergent surfactant is selected from the group consisting of nonionic surfactants, anionic surfactants and mixtures thereof.

21. A composition according to claim 19 further comprising from 0 to about 80% by weight of a detergent builder.

22. A laundry detergent composition, which comprises:
   (a) from about 10 to about 50% by weight of an anionic detergent surfactant; and (b) from about 0.1 to about 10% by weight of a water-soluble zwitterionic compound having clay soil removal/anti-redeposition properties selected from the group consisting of:

(1) dizwitterionic compounds having the formula:

$$(R^2)_d-M^1-R^1-N^+-(R^2)_2 \quad (R^2)_f-M^1-R^1-N^+-(R^2)_f \text{ or}$$
$$\quad\quad\quad | \quad\quad\quad\quad\quad\quad\quad\quad | $$
$$\quad\quad\quad L \quad\quad\quad\quad\quad\quad\quad\quad L$$
$$\quad\quad\quad X \quad\quad\quad\quad\quad\quad\quad\quad X$$

$$\quad\quad\quad\quad\quad\quad (R^2)_e$$
$$\quad\quad\quad\quad\quad\quad\quad | $$
$$(X-L-)_2-M^2-R^1-M^2-(R^2)_f$$

(2) polyzwitterionic compounds having the formula:

$$R^3-(A^1)_q-(R^4)_t-M^2-(R^2)_d]_p$$
$$\quad\quad\quad\quad\quad\quad | $$
$$\quad\quad\quad\quad\quad\quad L$$
$$\quad\quad\quad\quad\quad\quad X$$

(3) zwitterionic polymers having the general formula:

$$\quad\quad (R^2)_d \quad (R^2)_e \quad (R^2)_e \quad (R^2)_d$$
$$\quad\quad\quad | \quad\quad\quad | \quad\quad\quad | \quad\quad\quad |$$
$$[X-L-M\frac{1}{w}-R^1-M\frac{2}{x}-R^1-M\frac{2}{y}-R^1-M^2-L-X]_z;$$
$$\quad\quad\quad\quad\quad\quad\quad | $$
$$\quad\quad\quad\quad\quad\quad\quad L$$
$$\quad\quad\quad\quad\quad\quad\quad X$$

and (4) mixtures thereof wherein $A^1$ is $$\begin{array}{cccccc} O & O & O & O & O & O \\ \| & \| & \| & \| & \| & \| \\ -NC-, & -NCO-, & -NCN-, & -CN-, & -OCN-, & -CO-, \\ | & | & | \; | & | & | & \\ R & R & R \; R & R & R & \end{array}$$

$$\begin{array}{cccc} O & O & O \; O & \\ \| & \| & \| \; \| & \\ -OCO-, & -OC-, & -CNC- & \text{or } -O-; \\ & & | & \\ & & R & \end{array}$$

R is H or $C_1-C_4$ alkyl or hydroxyalkyl; $R^1$ is $C_2-C_{12}$ alkylene, hydroxyalkylene, alkenylene, arylene, alkarylene, or a $C_2-C_3$ oxyalkylene moiety having from 2 to about 20 oxyalkylene units provided that no O—N bonds are formed; each $R^2$ is $C_1-C_4$ alkyl or hydroxyalkyl, $-(R^5O)_k-H$, the moiety —L—X or two $R^2$ together from the moiety $-(CH_2CH_2)_r-A^2-(CH_2CH_2)_s-$, wherein $A^2$ is —O— or $-CH_2-$, r is 1 or 2, s is 1 or 2, and r+s is 3 or 4; $R^3$ is a substituted $C_3-C_{12}$ alkyl, hydroxyalkyl, alkenyl, aryl or alkaryl group having p substitution sites; $R^4$ is $C_1-C_{12}$ alkylene, hydroxyalkylene, alkenylene, arylene, alkarylene, or a $C_2-C_3$ oxyalkylene moiety having from 2 to about 20 oxyalkylene units provided no O—O or O—N bonds are formed; $R^5$ is $C_2-C_3$ alkylene or hydroxyalkylene; L is a hydrophilic chain which contains the polyoxyalkylene moiety $-[R^6O)_m(CH_2CH_2O)_n]-$, wherein $R^6$ is $C_3-C_4$ alkylene or hydroxyalkylene and m and n are numbers such that the moiety $-(CH_2CH_2O)_n-$ comprises at least about 50% by weight of said polyoxyalkylene moiety; $M^1$ is an $N^+$ or N group; each $M^2$ is an $N^+$ or N group and at least one $M^2$ is an $N^+$ group; X is the anionic group $SO_3^-$ or a mixture of said anionic group and the nonionic group H; d is 2 when $M^1$ or $M^2$ is $N^+$ and is 1 when $M^1$ or $M^2$ is N; e is 1 when $M^2$ is $N^+$ and is 0 when $M^2$ is N; f is 3 when $M^2$ is $N^{30}$ and is 2 when $M^2$ is N; k is from 1 to about 100; for said dizwitterionic compounds, n is at least about 6; for said polyzwitterionic compounds and zwitterionic polymers, n is at least about 3; p is from 3 to 8; q is 1 or 0; t is 1 or 0, provided that t is 1 when q is 1; w is 1 or 0; and x+y is from 2 to 9.

23. A composition according to claim 22 wherein each $R^2$ is methyl or $-(R^5O)_k-H$.

24. A composition according to claim 23 wherein m and n are numbers such that the moiety $-(CH_2CH_2O)_n-$ comprises at least about 85% by weight of said polyoxyalkylene moiety.

25. A composition according to claim 24 wherein m is 0 and n is at least about 12.

26. A composition according to claim 25 wherein said zwitterionic compound is a dizwitterionic compound; $R^1$ is $C_2-C_6$ alkylene; and $M^1$ and each $M^2$ are an $N+$ group.

27. A composition according to claim 25 wherein said zwitterionic compound is a zwitterionic polymer, $R^1$ is ethylene; the $M^2$ groups are a mixture of from about 50 to 100% $N+$ groups and from 0 to about 50% N groups; and x+y+z is from 3 to 7.

28. A composition according to claim 25, wherein X is a mixture of from about 25 to 100% $SO_3^-$ groups and from 0 to about 75% H groups.

* * * * *